United States Patent [19]

Schurger et al.

[11] 4,242,828
[45] Jan. 6, 1981

[54] FLY SWATTER

[76] Inventors: Severin G. Schurger; Judith Schurger, both of 3266 SW. 25 Ter., Miami, Fla. 33133

[21] Appl. No.: 33,130

[22] Filed: Apr. 25, 1979

[51] Int. Cl.³ .............................................. A01M 3/02
[52] U.S. Cl. ...................................................... 43/137
[58] Field of Search ................. 43/134, 135, 136, 137; 81/43; 7/170

[56] References Cited
U.S. PATENT DOCUMENTS

| | | | |
|---|---|---|---|
| 2,601,487 | 6/1952 | Zilinsky | 43/137 |
| 2,806,320 | 9/1957 | Griffith | 43/137 |
| 2,911,250 | 11/1959 | Lossius | 43/137 X |
| 2,934,851 | 5/1960 | Grish | 43/137 |
| 2,948,986 | 8/1960 | Williamson | 43/55 |
| 3,140,715 | 7/1964 | Whitton | 81/43 X |
| 3,203,135 | 8/1965 | Tunnell | 43/137 |

Primary Examiner—Nicholas P. Godici

[57] ABSTRACT

An improved fly swatter including a working end and a handle having a terminal end. In one embodiment shown, the terminal end of the fly swatter handle is provided with a longitudinally extending recess in which there is a pick-up device which is adapted to be slidably and axially removed from the recess and which is composed of a pair of bifurcated members or legs which are hingedly connected to one another at a handle end and normally yieldably urged apart; the legs are adapted to be brought into and out of confronting relation by manipulation of the terminal end of the handle of the pick-up device. When removed from the fly swatter, the pick-up device is utilized for picking up dead flies and the like. In alternative embodiments illustrated, the pick-up device is carried in piggy-back relation to the fly swatter for removal and use.

9 Claims, 8 Drawing Figures

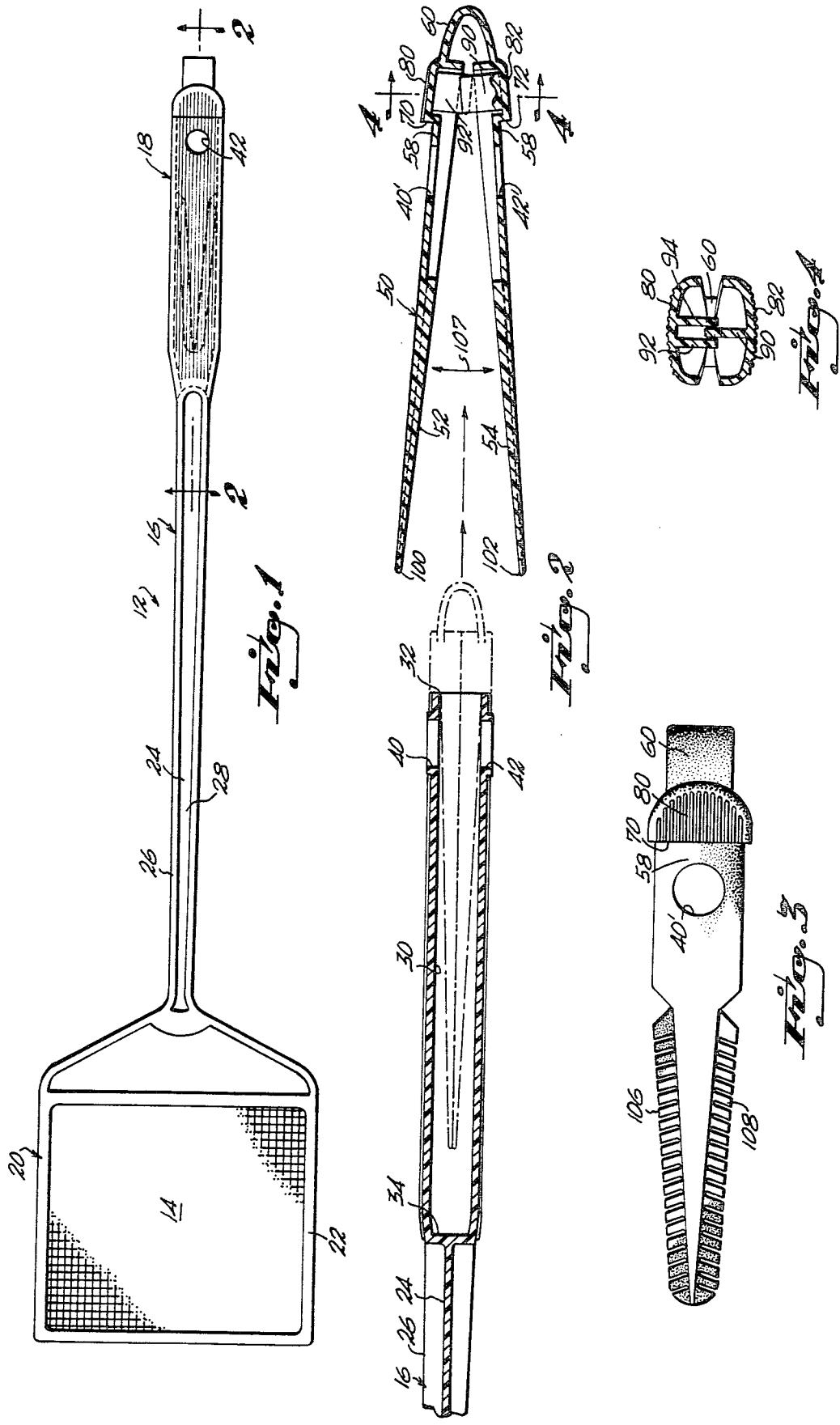

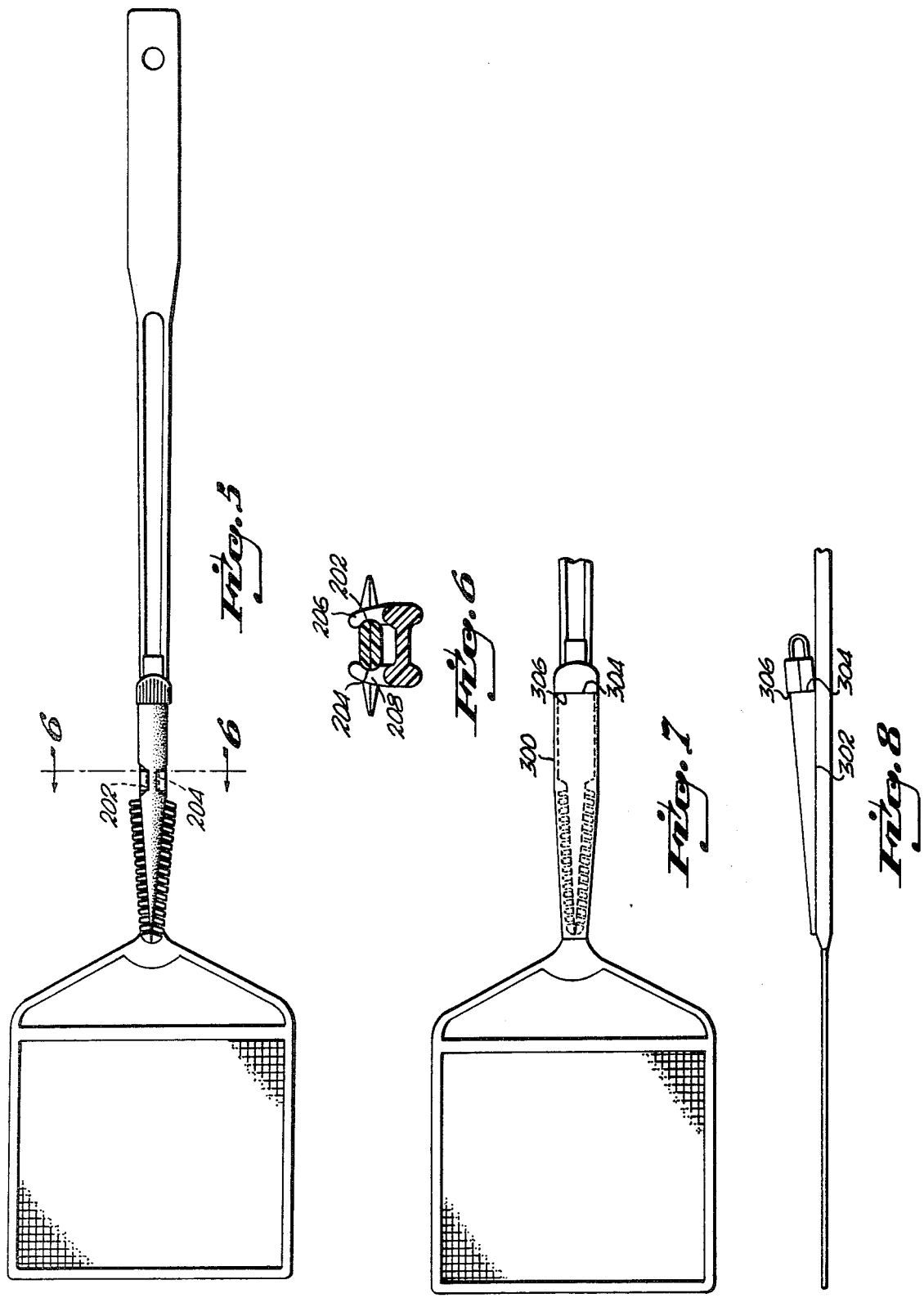

4,242,828

FLY SWATTER

FIELD OF THE INVENTION

This invention relates to fly swatters and, more particularly, to a fly swatter which includes a pick-up device for use in picking up a fly.

BACKGROUND OF THE INVENTION

In the past it has long been recognized that picking up a dead fly is objectionable to many and in any event unhealthy because of germs, etc.; however, it is, also recognized that the killing of such flies is necessary. For this reason there have been numerous types of devices such as the insect retriever of U.S. Pat. No. 2,601,487; the pick-up device, such as that of U.S. Pat. Nos. 2,806,320 and 2,911,250 and 3,203,135. This invention is of a fly swatter which includes a pick-up device and which is of an improved construction as is set forth more fully hereinafter.

SUMMARY OF THE INVENTION

This invention is composed of a fly swatter in one embodiment shown which has an elongate handle of rigid plastic material with a working end and a terminal handle end which is provided with a longitudinally extending recess that is sized to receive bifurcated legs of a pick-up device to a predetermined depth and wherein the legs of the pick-up device are hingedly connected to one another by a plastic hinge strap which normally urges the legs apart but which is yieldable to close upon manipulation for picking up and disposing of a dead fly. In alternative embodiments, the pick-up device is removably mounted on the fly swatter handle, or preferred construction.

OBJECTS OF THE INVENTION

It is an object of this invention to provide a fly swatter and a pick-up device which is composed of a small number of parts and which may be of molded plastic material including a handle for the fly swatter which in one embodiment is provided with a longitudinally extending recess to removably house a pick-up device composed of a pair of hingedly connected bifurcated legs which are sized to be inserted longitudinally into the recess for convenient storage when not in use within the fly swatter and which may be separated from the fly swatter for use as desired in picking up flies and the like.

It is, accordingly, a general object of this invention to provide an improved fly swatter of the type described more fully hereinafter and which is shown in the drawings and which is composed of a pair of molded plastic parts in which are adapted for mating interengaged relationship. One of the parts serves as a handle within which there is a recess to store a separate pick-up device composed of a pair of hingedly connected legs which are sized for receipt in telescoping relation in the longitudinally extending recess of the handle, the same being of inexpensive plastic material, adapted to be of molded plastic construction, and which is simple and inexpensive to manufacture and which is well adapted for the purposes for which it was intended.

In accordance with these and other objects which will become apparent hereinafter, the instant invention will now be described with reference to the accompanying drawings in which:

DESCRIPTION OF THE DRAWINGS

FIG. 1 is a plan view of a fly swatter constructed in accordance with this invention;

FIG. 2 is a partially exploded view in cross section of the right-hand side of FIG. 1;

FIG. 3 is a top plan view of the right-hand portion of FIG. 1 illustrating the pick-up device; and FIG. 4 is a view in cross section taken on the plane indicated by the line 4—4 of FIG. 2 and looking in the direction of the arrows;

FIG. 5 is an alternative view of the instant invention;

FIG. 6 is a view in cross section taken on the plane indicated by the line 6—6 of FIG. 5 and looking in the direction of the arrows;

FIG. 7 is a partial view of a second alternatie embodiment of the instant invention.

FIG. 8 is a side view of a second alternative embodiment of the instant invention.

DESCRIPTION OF THE PREFERRED EMBODIMENTS

Referring to FIGS. 1 through 4 of the drawings where like reference characters designate like or corresponding parts throughout several views and referring to FIG. 1, the numeral 12 generally designates a fly swatter having a conventional working end 14 and a handle 16 having a terminal end zone 18, said handle being elongated and preferably of molded plastic material, of which the end 20 comprises a frame which is spanned by a screen means 22. In the preferred embodiment the handle is of plastic and relatively rigid. The handle which may have a web 24 bounded by longitudinally extending relatively thick side walls or edges 26 and 28. The terminal distal end 18 includes an internal recess generally designated by the numeral 30 which extends inwardly from a mouth 32 longitudinally to an end wall 34 at the web 24. In the terminal end zone adjacent the mouth 32, there are a pair of aligned holes 40 and 42 for use in hanging the device. Within the recess 30 there is a pick up device generally designated by the numeral 50 which is composed of a pair of legs 52 and 54 which are joined together at their proximal ends 56 and 58 by a hinge 60. At the juncture of the hinge 60 and the legs there is a shoulder formed on each leg as at 70 and 72. Preferably between the shoulder and the hinge there is a rigidifying zone 80 and 82 which are adapted to be squeezed together to bring the legs into and out of confronting relation. Preferably from the interior of the rigidifying zone 80 and 82 there are mating confronting projections 90, 92, and 94 which serve as guide means so that the legs are constrained to reciprocal movement into and out of clamping engagement of their terminal or distal ends 100 and 102.

It will be seen on reference to FIG. 2 and FIG. 1 that the legs are sized for insertion longitudinally into the recess to a depth such that the rim of the mouth as at 32 is in abutting engagement with the shoulders 70 and 72. Preferably the legs are provided finned edges 106 and 108 as shown in FIG. 3 in a preferred embodiment for a sweeping type action in use, now to be described.

In use the fly swatter is used in a conventional manner. When a fly has been killed, one merely removes the pick-up device 50 from the recess 30 in the end 18 of the fly swatter 12 by pulling it longitudinally therefrom. The normal memory of the plastic device will cause the legs to expand somewhat as indicated by the arrowed line 107 in FIG. 2 at the right. The user then grips the rigidifying zone 80 and 82 between the thumb and forefinger bringing the legs together and picking up the fly for disposal. After this operation, the pick-up device is then reinserted into the fly swatter.

It is thus seen that there has been provided a simple and inexpensive plastic device which may be readily manufactured inexpensively and which will avoid the objectionable and unhealthy task of picking up flies in a manner likely to cause germs to get on the fingers of the user.

It will be noted that in the above preferred embodiment the legs at their proximal ends are provided with through holes 40 and 42 which are aligned with one another and which, when the pick-up device is inserted into the recess, are in registry with the aforementioned holes 40 and 42 of the handle so that the device may be conveniently hung on a peg for use. Also, the legs are normally in an apart attitude, but the same are yieldable upon manipulation to close for the fly pick-up operation or for storage in the handle.

In the embodiment of FIGS. 5, and 6, which are not here redescribed in detailed to shorten this application it is seen that the legs are provided with notches 202 and 204 for mating engagement with a pair of hooked members 206 and 208 on opposite sides of the longitudinally extending slot along the handle, so that the sides may be bowed apart for hook-up engagement of the hook members with the pick-up to normally carry the same in piggy-back relation as shown. In the embodiments of FIGS. 7 and 8, a receptacle 300 is fixed to the handle, as at 302. The receptacle is of a length to jacket the collapsed legs of the pick-up device, as shown, with the rim 304 of the mouth being sized to abut the shoulder 306 of the pick-up.

In the preferred embodiment the rigid plastic material which is utilized may be of polyethylene or polypropylene.

In the preferred embodiment as shown in FIG. 3, the legs taper as so to converge to a terminal end as at 100 and 102 in FIG. 2 which are pointed and the longitudinally extending tapered edges are finned due to fine sweeping edges.

In the preferred embodiment the overall length of the legs and hinge as seen in FIG. 3 is about three (3) inches and preferably between two (2) and six (6) inches; and, in the preferred embodiment the length of the legs which penetrate within the longitudinally extending recess of the handle is about two and one-half (2½) inches and in a range of between three (3) and six (6) inches.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An improved fly swatter comprising:
    a working end,
    a handle, the handle being elongate and having a terminal distal end, the terminal distal end having a recess inwardly extending toward the working end,
    a separate pick-up member comprising a pair of legs having a terminal end and a proximal end, hinge means joining the legs at the terminal end for hinged connection therewith, a shoulder means between the hinge means and the proximal end of the legs, the shoulder means formed on the legs for abutting engagement with the terminal distal end of the handle and closing the recess when inserted in the recess and releasably connected to the handle for removal therefrom to pickup a dead fly or the like.

2. The device as set forth in claim 1 wherein said handle is of rigid plastic material, and said pick-up device is of rigid plastic material.

3. The device as set forth in claim 1 wherein said plastic material is polyethylene.

4. The device as set forth in claim 1 wherein said plastic material is polypropylene.

5. The device as set forth in claim 1 wherein said legs comprise leaf-like members having longitudinally extending tapered edges and said edges are finned defining sweeping surfaces.

6. The device as set forth in claim 1 wherein said the handle includes a web zone and enlarged outer longitudinally extending edges symmetrical with respect to said web zone.

7. The device as set forth in claim 1 wherein said pick-up device hinge means includes rigidifying zone, said rigidifying zone having an inside surface and an outside surface, said inside surface including mating guide means in confronting relation for one another for guiding hinged movement of said legs toward one another with respect to said hinge.

8. The device as set forth in claim 1 wherein said pick-up device legs define a pair of aligned holes, one hole in each leg and a center line through the holes each spaced a predetermined distance from the hinge means, and
    said terminal end zone of said handle defines a pair of aligned holes and a center line passing through said holes and spaced a predetermined distance from the recess, that distance being equal to the distance from the center line of the holes of said bifurcated legs and hinge means such that when the pick-up device is in abutting engagement with the terminal end of the handle the holes of the handle and the pick-up device are in alignment.

9. The device as set forth in claim 1 wherein said legs are of a length extending from the shoulder to the distal end which is greater than two (2) inches and not more than four (4) inches.

* * * * *